Patented June 12, 1945

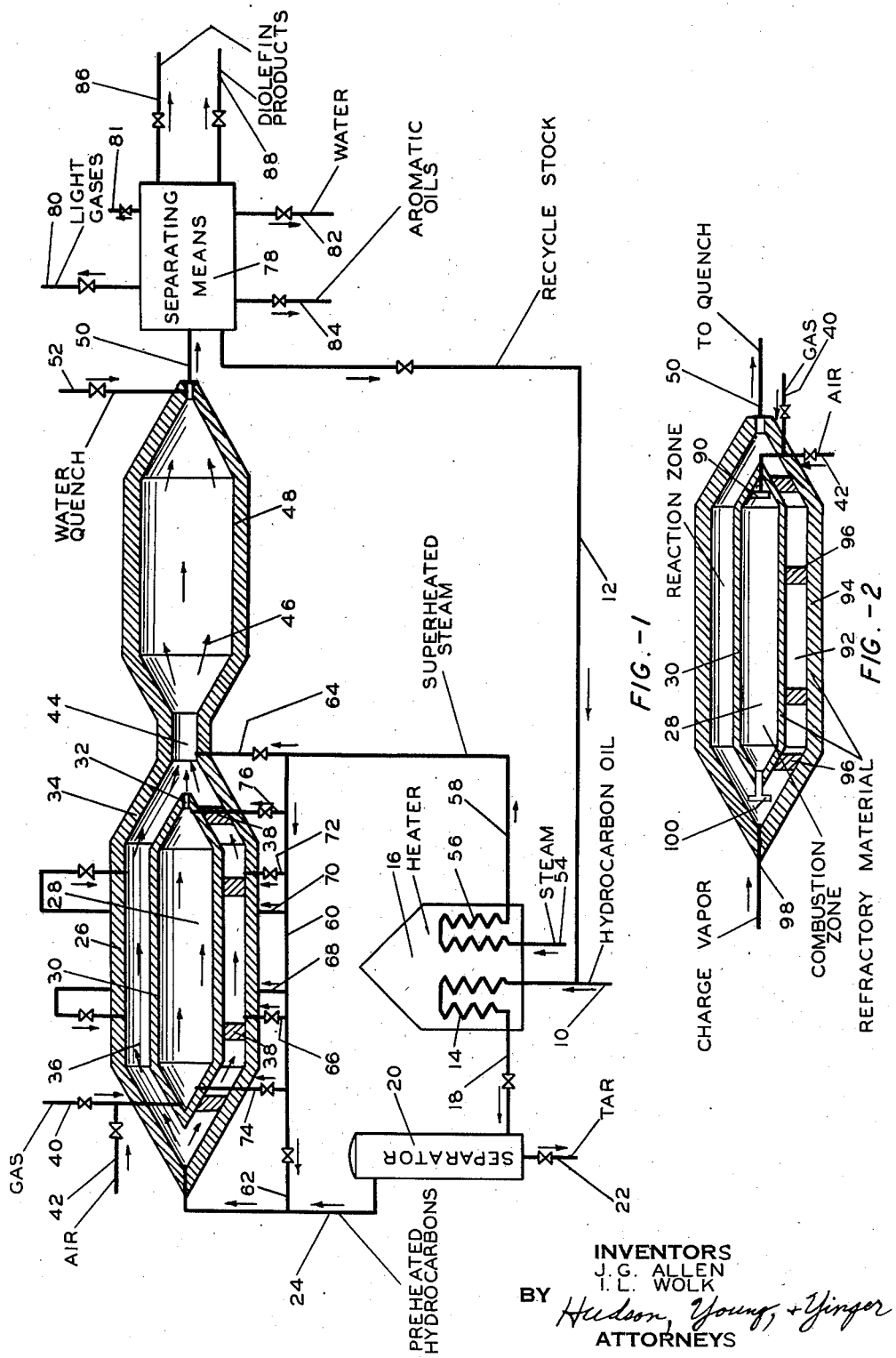

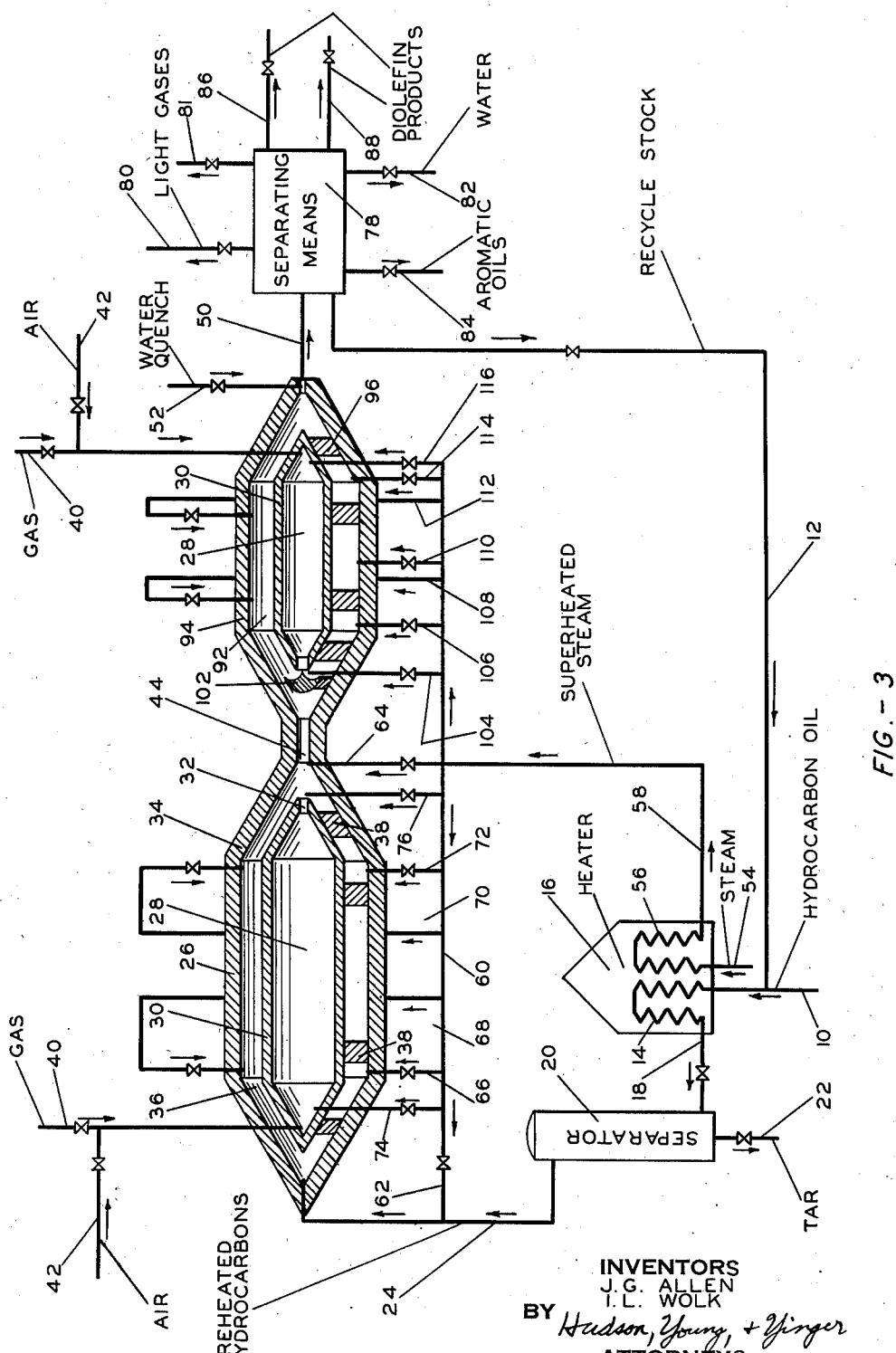

2,377,847

UNITED STATES PATENT OFFICE 2,377,847

PROCESS FOR CONVERTING HYDROCARBONS

John Gordon Allen and I. Louis Wolk, Bartlesville, Okla., assignors to Phillips Petroleum Company, a corporation of Delaware Application July 24, 1943, Serial No. 496,090

3 Claims. (Cl. 260—680)

The present invention relates to a novel method, and apparatus, for effecting the conversion of hydrocarbons. In a more particular embodiment our invention relates to cracking of hydrocarbons for the production of mixtures containing substantial proportions of low-boiling diolefins, such as butadiene. The method and apparatus disclosed herein are adaptable also to production of olefin-, acetylene-, and/or aromatic-containing mixtures.

The production of low-boiling diolefinic hydrocarbons such as butadiene, isoprene, piperylene, etc., has recently become of vital importance for the manufacture of synthetic rubber-like materials. In perphaps the most important type of synthetic rubber the diolefinic constituent comprises about 75 per cent of the raw material. While relatively high yields of diolefins may be obtained through carefully controlled selective catalytic processes, for example, the catalytic dehydrogenation of normal butenes to butadiene, such processes suffer somewhat from the disadvantage of requiring a careful isolation of feed stocks which may be needed for other purposes. Furthermore, a high initial capital expenditure is required.

In order to obtain a substantial production of diolefins in a relatively short period of time and to utilize less valuable stocks in so doing, attention has been directed to the non-catalytic cracking of petroleum oils. By virtue of the advantages of the present invention we may obtain optimum reaction conditions for converting relatively light normally liquid hydrocarbons into lower boiling diolefins in a very effective manner.

In one specific embodiment this invention involves the pyrolytic decomposition of hydrocarbons at elevated temperatures and low pressures and with relatively short contact time under conditions in which maximum butadiene may be produced without effecting too drastic a conversion of the hydrocarbon with concomitant losses resulting from formation of light gases, and decomposition of butadiene produced. It has been found that this type of conversion may be effected at temperatures ranging from 1300–1700° F. at contact times of a few thousandths of a second to about one second. In order to obtain rapid temperature elevation to the desired point, injection of hot flue gases into a preheated stream of hydrocarbon vapor has been proposed. Among the problems encountered in this type of process are the high heat requirements and the necessity of obtaining rapid intimate mixing so as to obtain the benefit of the high temperature flue gas as quickly as possible.

In the present invention these problems are solved by combining the reaction zone and combustion zone for producing the hot flue gases in a novel manner so that most efficient heat exchange and intimate contact may be effected, and by carrying out the conversion of hydrocarbons in such apparatus.

According, it is an object of this invention to provide improved process and apparatus for the cracking of hydrocarbons. Another object is to produce optimum yields of low-boiling diolefinic hydrocarbons from non-aromatic hydrocarbon material comprising more-saturated hydrocarbons of at least four carbon atoms per molecule. A further object is to combine the preheating of such hydrocarbon material with the production of a hot flue-gas in a novel and advantageous manner, followed by direct mixture of the thus preheated hydrocarbon material with the hot flue gas to obtain a desired conversion. Another object is to effect an advantageous heat exchange between a combustion zone and a hydrocarbon preheating and/or reaction zone. Still another object is to heat a hydrocarbon material to conversion temperatures with great rapidity. A yet further object is to effect a rapid and intimate admixture of hot products of combustion with hydrocarbons to obtain optimum reaction conditions for producing butadiene. Still another object is to provide an apparatus suitable for the production of butadiene, requiring a minimum amount of critical materials. Other objects and advantages of the invention will be apparent from the accompanying disclosure and discussion.

The invention may perhaps best be understood by reference to the accompanying drawings and description thereof. Figure 1 is a somewhat diagrammatic flow sheet showing one manner of carrying out the process, including a vertical cross-section through a preferred modification of preheating and reaction zones constructed in accordance with the principles of the invention. Figure 2 is a vertical cross section through another preferred construction embodying combustion zone and reaction zone in concentric heat-exchange relation. Figure 3 is similar to Figure 1, except that the reaction zone utilized is similar to that of Figure 2, thus providing the advantages of the invention both in the preheating and in the reaction zone.

In Figure 1, the hydrocarbon feed stock, which is preferably a relatively light normally liquid non-aromatic petroleum fraction of narrow or wide boiling range, is introduced through line 10, joined by recycled material from line 12 if desired, and passed through coil 14 in furnace 16, where it is vaporized at temperatures of 500-900° F. or thereabouts. By non-aromatic is meant a hydrocarbon material containing no, or only a small amount, such as less than about 10 per cent, and preferably less than 5 per cent, of aromatic hydrocarbons. Such material should be comprised of hydrocarbons having at least four carbon atoms per molecule, on up to those boiling at say 600° F. or somewhat higher, should be more saturated than the diolefins to be produced, and preferably higher boiling than the latter. Examples of such materials which are preferred are straight run naphtha of narrow or wide boiling range, cracked naphtha of narrow or wide boiling range, mixtures of straight run and cracked materials, etc. The hydrocarbon vapors pass through line 18 to separator 20 and are flashed therein to remove any tar present, which is removed via line 22. Vapors are led from unit 20 via line 24 to the inlet of preheater 26. Preheater 26 is constructed of metal, refractory, and/or other suitable materials which will withstand the high temperatures encountered therein. It comprises an inner elongated combustion zone 28 formed by a shell 30 closed at one end and having an opening 32 of restricted cross sectional area at the other end. Surrounding this structure and concentric therewith is an outer shell 34, providing an annular preheating zone 36. Supports 38 are provided for chamber 30.

The hydrocarbon vapors pass through preheating zone 36 outside of and in contact with the hot wall of combustion zone 28. A fuel, such as gas, introduced through line 40, is burned with air, introduced through line 42, in zone 28 to provide the necessary heat for preheating the hydrocarbon feed and also to provide a hot flue gas. Preferably the fuel and air are proportioned to give a substantially oxygen-free flue gas, although this is not absolutely necessary, and a flue gas at the desired temperature and having oxidizing, neutral, or reducing properties as desired may be produced. The feed vapors are rapidly preheated in zone 36 to about 1000-1200° F., by heat exchange with the hot walls 30 of the combustion zone, and then flow into admixture with the hot products of combustion leaving the combustion zone 28 through restricted opening 32. The Venturi effect produced at the region where the flue gas and hydrocarbon meet facilitates rapid mixing, which is quite important. At this point the hydrocarbons are very rapidly raised to a temperature in the range of about 1300-1700° F. by admixture with the hot products of combustion, and the mixture passes directly through throat 44 into enlarged reaction zone 46 which is dimensioned to give the desired short reaction time at the high temperatures prevailing. The hot flue gases not only raise the temperature of the hydrocarbons rapidly into the reaction range, but also act as very desirable diluents in the reaction zone. Reaction zone 46 may be formed by walls 48 made of refractory or other heat-resistant material. The hot reaction products leaving zone 46 through line 50 are shock-cooled to a temperature below that at which further thermal reactions take place, as by contact with a spray of water introduced through line 52 or by other cooling means. The temperature must be rapidly reduced, preferably to below about 400° F.

It is preferred to utilize a substantial amount of diluent, such as steam, nitrogen, oxides of carbon, or the like, in admixture with the hydrocarbons being preheated and converted. To this end, a diluent, preferably steam, is introduced through line 54 to coil 56 in furnace 16 for superheating. The superheated steam is then led through line 58 to manifold 60, from which it may be introduced into the preheating and conversion apparatus at one or more points as desired, for example through line 62 for admixture with hydrocarbon vapors in line 24, and/or through line 64 into the mixture of hydrocarbons and combustion gases entering the reaction zone 46, as an additional heat carrier and/or temperature control medium. In order to prevent heating the hydrocarbons in zone 36 to too high a temperature, steam may be introduced thereinto at one or more intermediate points, as by lines 66, 68, 70, and/or 72. To protect the refractory and aid in the control of the temperature of the flue gas, steam may also be passed into the combustion zone, as through line 74, or at the restricted outlet 32 through line 76. By this means the flame temperature may if necessary be lowered to a point below the softening temperature of the refractory. A suitable material for use at about 3000° F. is the refractory sold under the trade name of "Insulbrix," although other suitable material may of course be used.

Introduction of superheated steam at or near the flue gas outlet, as by lines 76 or 64, is useful in lowering the temperature thereof to a desired point. The use of steam at any point lowers the hydrocarbon partial pressure in the cracking zone, acting as a diluent. At the same time the effective contact time in the cracking zone is reduced, thus enabling the process to be carried out at the extremely short times required for satisfactory butadiene production. The temperature of the steam introduced may be the same, or may vary, from point to point, and will depend on the amount of temperature control to be effected and on the volume of steam used. The use of steam or other diluent is optional, and where quite high velocities of flue gas and feed are used, is not necessarily required. However, as stated, the use of a diluent such as steam is generally preferred, and the mol ratio of diluent to hydrocarbon should be in the range of from about 0.5:1 to about 5:1 for best results.

The pressure to be maintained within the reaction zone should be relatively low, that is from somewhat below atmospheric up to say 50 pounds per square inch absolute. It is generally most convenient, however, to maintain just sufficient pressure to overcome the pressure drop through the apparatus, and accordingly it may be said that substantially atmospheric pressures are preferred. The pressures in the combustion zone and in the preheating zone are of course related to those in the reaction zone, being higher by an amount equal to the pressure drop between the same and the reaction zone. As stated before, the use of steam or other diluent reduces the partial pressure of the hydrocarbons, so that effective hydrocarbon pressures substantially lower than atmospheric are thus readily attained if desired.

The hydrocarbons are preferably cracked to give optimum yields of diolefins, such as from about 3 to about 7 weight per cent butadiene per pass on naphtha charged, at temperatures in the range of about 1300 to about 1700° F., for a time of from about 0.5 to 0.01 second, the shorter contact times being used at the higher temperatures. The preferred range is 0.1 to 0.02 second at 1400–1600° F. By variation in conditions, butadiene, ethylene, propylene, butenes, acetylene, or aromatics such as benzene and toluene, or mixtures of these compounds may be the principal products. For example, optimum yield of aromatics is obtained at similar temperature levels if longer contact times, such as from a few tenths of a second at the higher temperatures up to a minute or so at the lower temperatures, are used. Maximum yields of isobutylene, butenes-1 and -2, and total $C_4$ are generally obtainable at approximately the same time-temperature conditions as those for maximum butadiene yield.

Returning now to the quenched reaction mixture in line 50, this material is passed to a separating means indicated diagrammatically at 78. Treatment of the material in this means may include settling, additional cooling, compression, scrubbing, fractionation, solvent extraction, and the like as will be readily supplied by one skilled in the art. As an example, the mixture of hydrocarbon, flue gas and water may be compressed to about 125 pounds per square inch and cooled. The condensate, comprising propylene and heavier, may be charged to a depropanizer, and the kettle product therefrom passed to a debutanizer from which a butadiene-containing stream is obtained. A $C_5$ and/or other cuts containing diolefins may be separated from the debutanizer bottoms. The uncondensed hydrocarbons and flue gas from the compressing and cooling step may be charged to an oil absorption system for separation of the flue gas from the hydrocarbons. Any other system may of course be used. Light gases are removed via line 80. Water used in quenching, diluting, and produced by the combustion is separated via line 82. Any aromatic oils produced may be recovered through line 84. Recycle stock, such as non-aromatic hydrocarbons having a proper boiling range and other desired characteristics may be passed via line 12 for re-cracking to produce higher ultimate yields of diolefin. One or more diolefinic products, particularly butadiene, but which may also include isoprene, piperylene, cyclopentadiene, hexadienes, and the like, are recovered from the other material by any known method, such as extractive distillation with furfural or other solvent, solvent extraction, formation and subsequent decomposition of diolefin-cuprous chloride or other diolefin-metal salt complex, etc., and passed via lines 86 and/or 88 to storage or utilization. Other matter may exit via line 81.

In Figure 2, a combustion zine 28 is formed by the elongated structure 30, provided at one end with a burner 90 fed by gas and air introduced through lines 40 and 42, respectively. Surrounding 30 and thus providing an annular space 92 is outer shell 94. Unit 30 rests on refractory supports 96. Space 92 serves as the reaction zone for cracking the hydrocarbon material, which is introduced thereinto via line 98. Hot combustion gases leave zone 28 through the restricted outlet and distributing device 100, and immediately mix with the entering hydrocarbon material, bringing the latter up to reaction temperature very quickly. The resultant admixture passes through reaction zone 92, which is of the proper size to give the desired short reaction time, in heat exchange with the outer walls 30 of the combustion zone 28, receiving therefrom sufficient heat to maintain temperatures in spite of the highly endothermic cracking reaction which is occurring. Diolefin-containing effluents in line 50 are quenched to avoid continuance of reaction, and treated as described with reference to Figure 1. It will be understood that hydrocarbon feed to the reactor of Figure 2 may be preheated as desired, and that steam or other diluent also may be used as desired in a manner similar to that disclosed for Figure 1.

In carrying out the production of diolefins or other products by cracking in the apparatus of Figure 2, the initial temperature of the mixture of flue gas and hydrocarbons need not be quite so high as in the process carried out in the apparatus of Figure 1, since additional heat is supplied to the hydrocarbons subsequent to their mixture with hot products of combustion. However, this initial temperature is still preferably in the range of 1300–1700° F. In the case of Figure 1, the initial mixture temperature is generally a maximum, with some cooling occurring in reaction zone 46 due to the endothermic nature of the reaction therein. In any case, it is required that the temperature be raised from the preheat temperature of 1000–1200° F. up to the reaction temperature of 1300–1700° F. very rapidly, which is readily accomplished by the manner of operating disclosed herein.

Figure 3 illustrates apparatus in which both a preheating and a reaction zone are constructed in accordance with the invention. The flow of hydrocarbon and diluent, and the construction of the preheating apparatus, are as shown and described in Figure 1. Steam is shown introduced at somewhat different points merely as another example of possible arrangements. The admixture of preheated hydrocarbons and hot products of combustion pass through throat 44 into the reaction zone, which is constructed and operated in a manner similar to that shown in Figure 2. Instead of distributing device 100, a streamlined baffle or similar element 102 may be provided for directing the flow of reaction mixture and hot flue gases. Lines 104, 106, 108, 110, 112, 114, and 116 may be provided for introducing diluent at any desired points. The operation, and advantages, of the process in the apparatus of Figure 3 will be readily understood from the foregoing description.

It will be seen that in our apparatus and in the operation thereof we have provided the means of attaining the required reaction conditions for the production of diolefins, particularly a rapid heating to high reaction temperatures. At the same time a high thermal efficiency is obtained by the novel arrangement of elements. The high-temperature combustion zone is completely surrounded by the lower-temperature preheating and/or reaction zone, so that minimum radiation losses are entailed. The apparatus may be constructed almost entirely from refractories rather than metals, which is a particularly important feature at the present time in view of the classification of almost all metals, particularly high temperature alloys, as critical materials. Various other advantages of the invention will be apparent from the present disclosure to one skilled in the art.

The following examples illustrate results obtainable when operating in accordance with the invention, but should not be taken as unduly limiting the same, inasmuch as other feed stocks, temperatures, times, and other reaction conditions may also be used as disclosed herein.

Example I

Naphtha vapor preheated to 750° F. is charged to the heating zone of Figure 1. The effluent therefrom at 1000° F. mixes with flue gas from the combustion zone which is at a temperature of 3000° F. The resultant mean temperature in the reaction zone is 1500° F., and a contact time of 0.2 second is realized. A C₄ fraction containing about 40 weight per cent butadiene is obtained, representing about 4 per cent butadiene based on the weight of charge for a once-through operation.

Example II

Naphtha and steam are heated separately to about 1100° F. A mol ratio of steam to naphtha of 3:1 is used. Flue gas at about 2500° F. is admixed with charge in the apparatus of Figure 2 to give a mixture temperature of 1500° F. Flow rates are adjusted in accordance with the volume of the reaction zone to give a reaction time of approximately 0.1 second. The hot reaction effluents are quenched to about 750° F. by a water spray and the water then condensed by further cooling to separate same. The hydrocarbon mixture is then separated from the flue gas and into several cuts as described above by compression, cooling, and fractionating, and a C₄ fraction containing about 45 per cent butadiene is obtained. The butadiene recovered from this fraction by extractive distillation with furfural amounts to 4.5 per cent by weight of the charge.

Example III

Air and methane are delivered to the combustion zone in the preheater of Figure 3 in proportions required for the production of a flue gas substantially free from O₂ and CO. The temperature of the flue gas leaving via 32 is maintained at about 2500° F. by introducing superheated steam into the burning zone of the preheater. Heavy straight run naphtha vapors diluted with an equal volume of steam and preheated to about 800° F. are introduced into the preheating zone 36 and the effluent vapors from this zone are quickly raised to a temperature of about 1200° F. by contact with the walls of the combustion zone. Excessive rise in temperature is prevented by dilution with steam at a temperature of about 750° F. introduced at a plurality of points in the preheating zone. The preheated hydrocarbon-steam mixture at 1200° F. is almost instantaneously mixed with the flue gas at 2500° F. in the apparatus described and the mixture at a temperature of about 1500° F. flows through reaction zone 92 with a contact time of about 0.05 second. In this zone the endothermic heat of reaction is compensated for and the reactants raised in temperature an additional 150 degrees due to the fact that combustion of air and methane takes place in zone 28 and the hot products of combustion are admixed with the reactants. The reaction products leaving via line 50 are at a temperature of about 1650° F. before quenching. After water quenching to about 500° F., the effluents are fractionated and a C₄ fraction recovered containing about 45% butadiene which represents about 4% per pass conversion to butadiene based on weight of charge.

While the process and apparatus of our invention have been described in some detail as to preferred modifications, other variations may of course be utilized without departing from the spirit of the invention. For example, solid contact material such as silicon carbide, quartz, firebrick, etc., in lump or brick form, may be used in the preheating and/or reaction zones. As a further alternative, heat exchange may be facilitated by putting fins or the like on the walls of the combustion zone to project into the heating or reaction zone. Light gases such as ethane, propylene, butane, etc., or mixtures thereof, may be pyrolytically cracked in the same manner as that disclosed for naphthas. These and other modifications may readily be made by one skilled in the art in view of the detailed disclosure herein.

We claim:

1. A process for producing low-boiling diolefin hydrocarbons of at least four carbon atoms per molecule from a low-boiling essentially nonaromatic hydrocarbon material comprising more-saturated hydrocarbons of at least four carbon atoms per molecule, which comprises burning a fuel in a first enclosed combustion zone, burning a fuel in a second enclosed combustion zone, passing such a hydrocarbon material in the gaseous state in intimate direct heat exchange with the outer walls of said first combustion zone to rapidly heat said hydrocarbon material to a temperature between about 1000 and about 1200° F., passing hot combustion products from said first combustion zone and said heated hydrocarbon material to a mixing zone of restricted cross-sectional area and rapidly and intimately admixing the same therein to increase the temperature of said hydrocarbon material, thereby forming a preheated reaction mixture, also passing hot combustion products from said second combustion zone to a mixing zone for rapid and intimate admixture with said preheated reaction mixture to produce a gaseous mixture having a temperature between about 1300 and about 1700° F., passing said gaseous mixture in intimate direct heat exchange with the outer walls of said second combustion zone to maintain the same within said temperature range for a reaction time such as to produce an optimum yield of low-boiling diolefin hydrocarbons, shock-cooling the resulting reaction mixture to a temperature such that there is a cessation of hydrocarbon conversion reactions, and recovering a low-boiling diolefin hydrocarbon so produced.

2. A process according to claim 1 in which steam diluent is introduced into the gaseous hydrocarbon material passing in heat exchange with at least one of said combustion zones.

3. A process according to claim 1 in which butadiene is produced and recovered.

JOHN GORDON ALLEN.
I. LOUIS WOLK.